United States Patent
Kuo et al.

(10) Patent No.: US 8,605,777 B2
(45) Date of Patent: Dec. 10, 2013

(54) CIRCUIT FOR RECOGNIZING A BEGINNING AND A DATA RATE OF DATA AND METHOD THEREOF

(75) Inventors: Kuo-Cyuan Kuo, Tainan (TW); Cheng-Pin Huang, Taoyuan County (TW); I-Ta Chen, Taipei (TW)

(73) Assignee: Etron Technology, Inc., Hsinchu (TW)

( * ) Notice: Subject to any disclaimer, the term of this patent is extended or adjusted under 35 U.S.C. 154(b) by 146 days.

(21) Appl. No.: 13/050,891

(22) Filed: Mar. 17, 2011

(65) Prior Publication Data

US 2011/0292986 A1 Dec. 1, 2011

Related U.S. Application Data

(60) Provisional application No. 61/350,024, filed on Jun. 1, 2010.

(30) Foreign Application Priority Data

Oct. 26, 2010 (TW) .............................. 99136522 A

(51) Int. Cl.
*H04B 3/46* (2006.01)
(52) U.S. Cl.
USPC .......................................... 375/225; 375/224
(58) Field of Classification Search
USPC ........................................ 375/225, 224; 702/79
See application file for complete search history.

(56) References Cited

U.S. PATENT DOCUMENTS

| | | | | |
|---|---|---|---|---|
| 5,463,664 A * | 10/1995 | Nakaya | ........................ | 375/360 |
| 6,968,279 B2 * | 11/2005 | Gfeller et al. | .................... | 702/79 |
| 7,190,308 B2 | 3/2007 | Goldberg | | |
| 7,453,958 B2 * | 11/2008 | Greco et al. | .................. | 375/326 |
| 7,693,088 B2 * | 4/2010 | Daugherty et al. | ........... | 370/253 |
| 7,934,112 B2 | 4/2011 | Von Bokern | | |
| 2002/0194360 A1 | 12/2002 | Schonherr | | |
| 2009/0323730 A1 * | 12/2009 | Caltagirone et al. | .......... | 370/535 |

FOREIGN PATENT DOCUMENTS

| | | |
|---|---|---|
| CN | 1902617 A | 1/2007 |
| TW | I281795 | 5/2007 |

* cited by examiner

*Primary Examiner* — Shuwang Liu
*Assistant Examiner* — Helene Tayong
(74) *Attorney, Agent, or Firm* — Winston Hsu; Scott Margo

(57) ABSTRACT

A circuit for recognizing a beginning and a data rate of data includes at least two data rate detecting units and a post processing unit. The at least two data rate detecting units are used for comparing at least two alignment patterns corresponding to different data rates with data simultaneously to recognize a data rate of the data. The post processing unit is coupled to the at least two data rate detecting units for recognizing a beginning of the data according to an alignment pattern corresponding to the data when the data rate of the data is recognized.

4 Claims, 4 Drawing Sheets

CIRCUIT FOR RECOGNIZING A BEGINNING AND A DATA RATE OF DATA AND METHOD THEREOF

CROSS REFERENCE TO RELATED APPLICATIONS

This application claims the benefit of U.S. Provisional Application No. 61/350,024, filed on Jun. 1, 2010 and entitled "Multi-Speed Detection Circuit," the contents of which are incorporated herein by reference.

BACKGROUND OF THE INVENTION

1. Field of the Invention

The present invention is related to a circuit for recognizing a beginning and a data rate of data and method thereof, and particularly to a circuit for recognizing a beginning and a data rate of data and method thereof according to an alignment pattern corresponding to a data rate.

2. Description of the Prior Art

Each data rate of data has a corresponding alignment pattern. When the data is transmitted from a device to a host, the host recognizes the data rate of the data and a beginning of the data according to the corresponding alignment pattern. In addition, the host uses the data rate to communicate with the device after the data rate of the data is recognized.

Please refer to FIG. 1. FIG. 1 is a diagram illustrating a circuit 100 for recognizing a beginning and a data rate of data according to the prior art. The circuit 100 includes a data rate detecting unit 102 and a post processing unit 104. The data rate detecting unit 102 detects a data rate (such as a data rate V1) one time, where at least one data rate is available between a host 106 and a device 108. When the data rate detecting unit 102 does not detect an alignment pattern corresponding to the data rate V1 in data transmitted between the host 106 and the device 108 after a predetermined time, the data rate detecting unit 102 starts to detect a data rate V2, and so on. However, the data rate detecting unit 102 only detects one data rate at a time, so if the data rate detecting unit 102 spends too much time detecting the data rate of the data, a clock and data recovery of a system may fail. In addition, if the host 106 can support a higher data rate, the data should be transmitted at the higher data rate between the host 106 and the device 108. But, in the prior art, during establishing a synchronous data rate (handshaking) between the host 106 and the device 108, the host 106 may use a lower data rate to communicate with the device 108 instead of using a higher data rate to communicate with the device 108.

SUMMARY OF THE INVENTION

An embodiment provides a circuit for recognizing a beginning and a data rate of data. The circuit includes at least two data rate detecting units and a post processing unit. The at least two data rate detecting units is used for comparing at least two alignment patterns corresponding to different data rates with the data simultaneously to recognize a data rate of the data. The post processing unit is coupled to the at least two data rate detecting units for recognizing the beginning of the data according to an alignment pattern corresponding to the data when the data rate of the data is recognized.

Another embodiment provides a method for recognizing a beginning and a data rate of data. The method includes utilizing at least two data rate detecting units to compare at least two alignment patterns corresponding to different data rates with data simultaneously to recognize a data rate of the data; recognizing a beginning of the data according to an alignment pattern corresponding to the data when the data rate of the data is recognized.

The present invention provides a circuit for recognizing a beginning and a data rate of data and method thereof. The circuit and method thereof utilizes at least two data rate detecting units to compare at least two alignment patterns corresponding to different data rates with the data simultaneously to recognize the data rate of the data transmitted between a host and a device. Therefore, the present invention not only recognizes the beginning and the data rate of the data transmitted between the host and the device quickly, but also reduces failures of a clock and data recovery (CDR) when the prior art spends too much time to recognize the data rate of the data transmitted between the host and the device. Further, the present invention can ensure that the host uses a higher data rate supported by the host to communicate with the device, instead of using a lower data rate to communicate with the device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
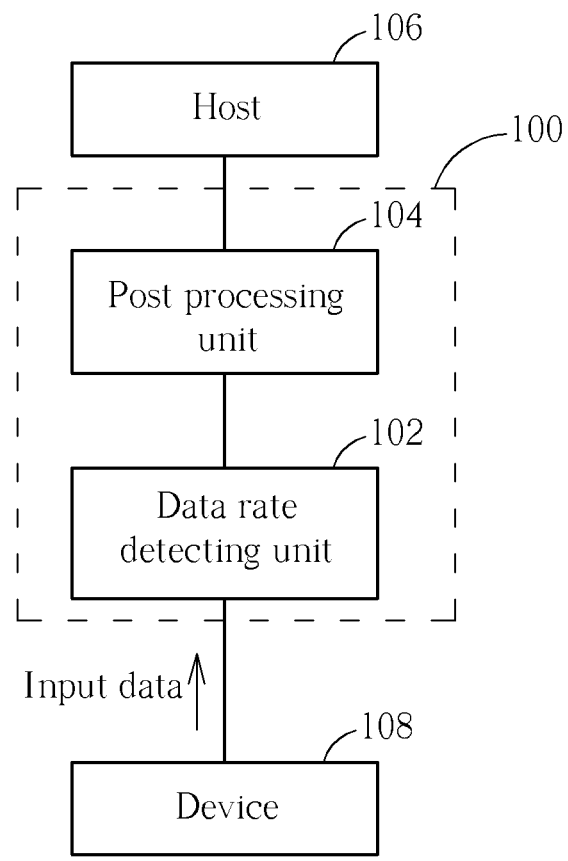
FIG. 1 is a diagram illustrating a circuit for recognizing a beginning and a data rate of data according to the prior art.
Figure 2:
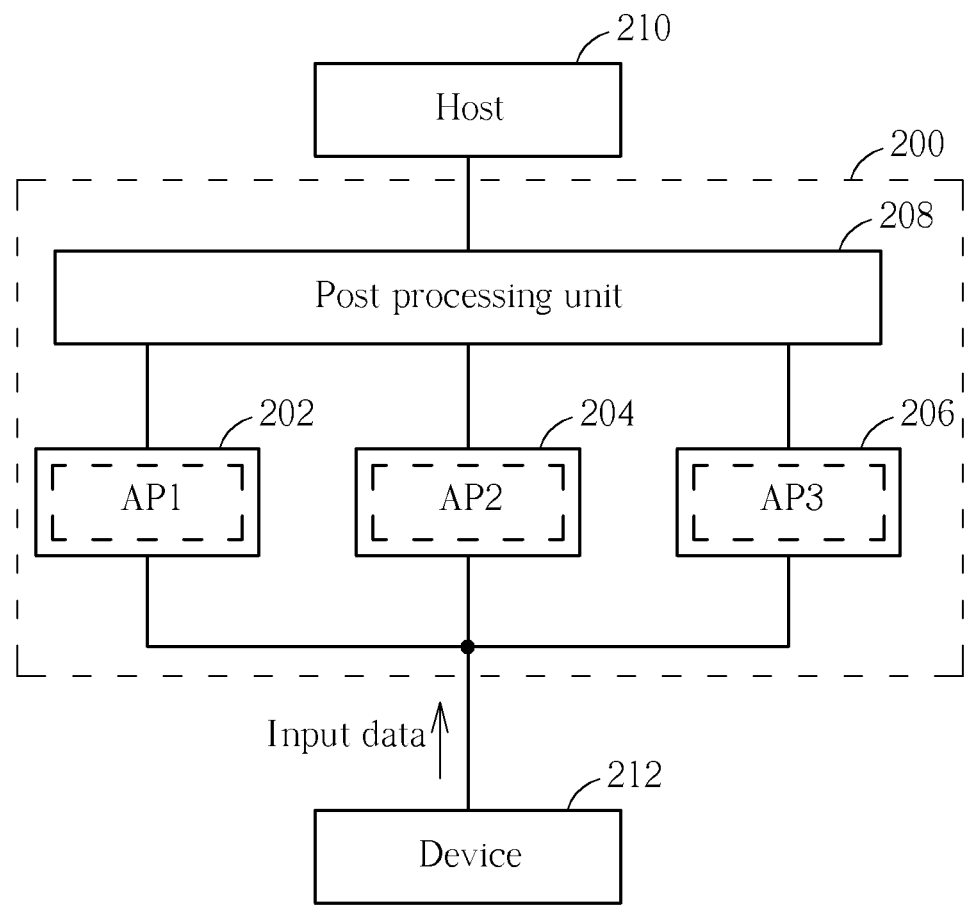
FIG. 2 is a diagram illustrating a circuit for recognizing a beginning and a data rate of data according to an embodiment.

Please refer to FIG. 2. FIG. 2 is a diagram illustrating a circuit 200 for recognizing a beginning and a data rate of data according to an embodiment. The circuit 200 includes three data rate detecting units 202, 204, 206 and a post processing unit 208, where three data rates of data are available between a host 210 and a device 212. The data rate detecting unit 202 includes an alignment pattern AP1 corresponding to a data rate V1, the data rate detecting unit 204 includes an alignment pattern AP2 corresponding to a data rate V2, and the data rate detecting unit 206 includes an alignment pattern AP3 corresponding to a data rate V3, where the data rate detecting units 202, 204, 206 compare the alignment patterns AP1, AP2, AP3 with data transmitted between the host 210 and the device 212 simultaneously to recognize a data rate of the data. The present invention is not limited to the three data rates of the data. Number of the data rate detecting units may change with number of the data rates of the data, that is, if five data rates of the data are available between the host 210 and the device 212, a user can change the number of the data rate detecting units to five through firmware.

The post processing unit 208 is coupled to the three data rate detecting units 202, 204, 206 for recognizing a beginning of the data according to an alignment pattern corresponding to the data when one of the three data rate detecting units 202, 204, 206 recognizes the data rate of the data.

Figure 3:
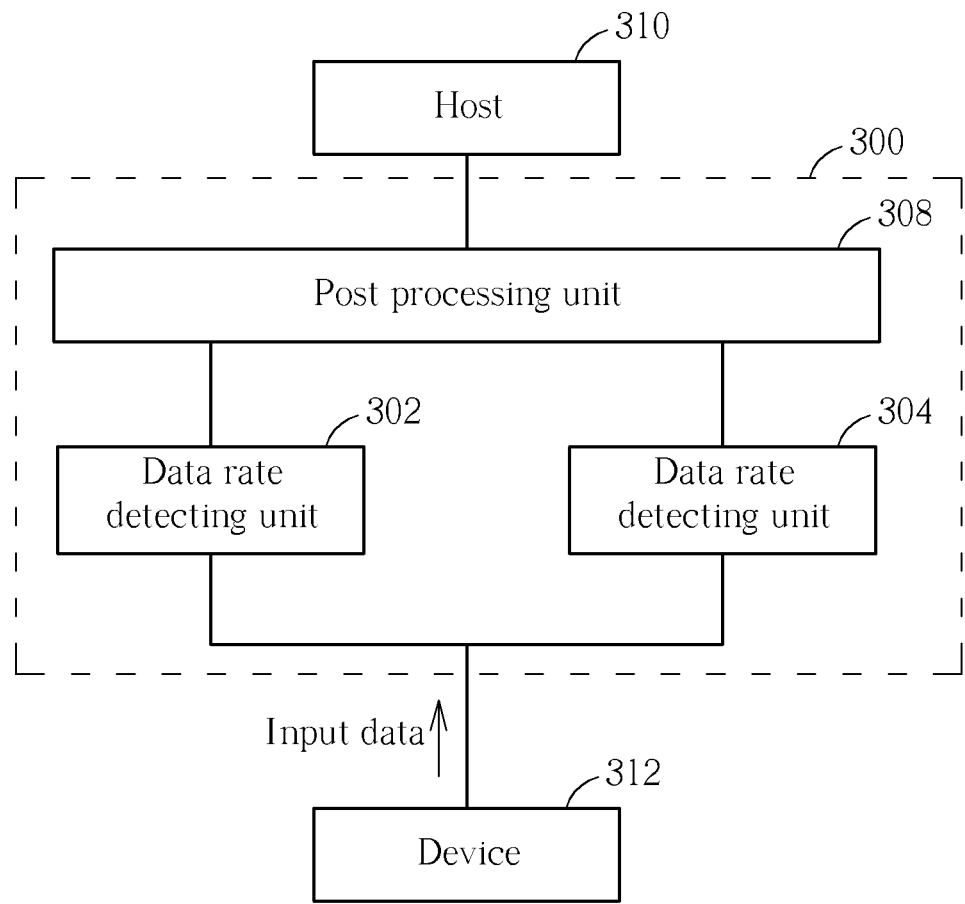
FIG. 3 is a diagram illustrating a circuit for recognizing a beginning and a data rate of data according to another embodiment.

Please refer to FIG. 3. FIG. 3 is a diagram illustrating a circuit 300 for recognizing a beginning and a data rate of data according to another embodiment. The circuit 300 includes two data rate detecting units 302, 304 and a post processing unit 308. The data rate detecting units 302, 304 compare alignment patterns AP1, AP2 with data simultaneously transmitted between a host 310 and a device 312 to recognize a data rate of the data, where the alignment pattern AP1 corresponds to the data rate V1, and the alignment pattern AP2 corresponds to the data rate V2. When the data rate detecting units 302, 304 recognize the data rate of the data transmitted between the host 310 and the device 312 according to the alignment patterns AP1, AP2, the post processing unit 308 recognizes a beginning of the data according to an alignment pattern corresponding to the data, where the post processing unit 308 is coupled to the data rate detecting units 302, 304. When the data rate detecting units 302, 304 do not recognize the data rate of the data transmitted between the host 310 and the device 312 according to the alignment patterns AP1, AP2, the data rate detecting units 302, 304 compare alignment patterns AP3, AP4 with the data simultaneously to recognize a data rate of the data transmitted between the host 310 and the device 312, where the alignment pattern AP3 corresponds to a data rate V3, and the alignment pattern AP4 corresponds to a data rate V4. The data rate detecting units 302, 304 keep comparing alignment patterns corresponding to data rates with the data transmitted between the host 310 and the device 312 until a data rate of the data is recognized, where the data rate V1 and the data rate V2 are two adjacent rates of a data rate specification between the host 310 and the device 312; and the data rate V3 and the data rate V4 are also two adjacent rates of the data rate specification.

Figure 4:
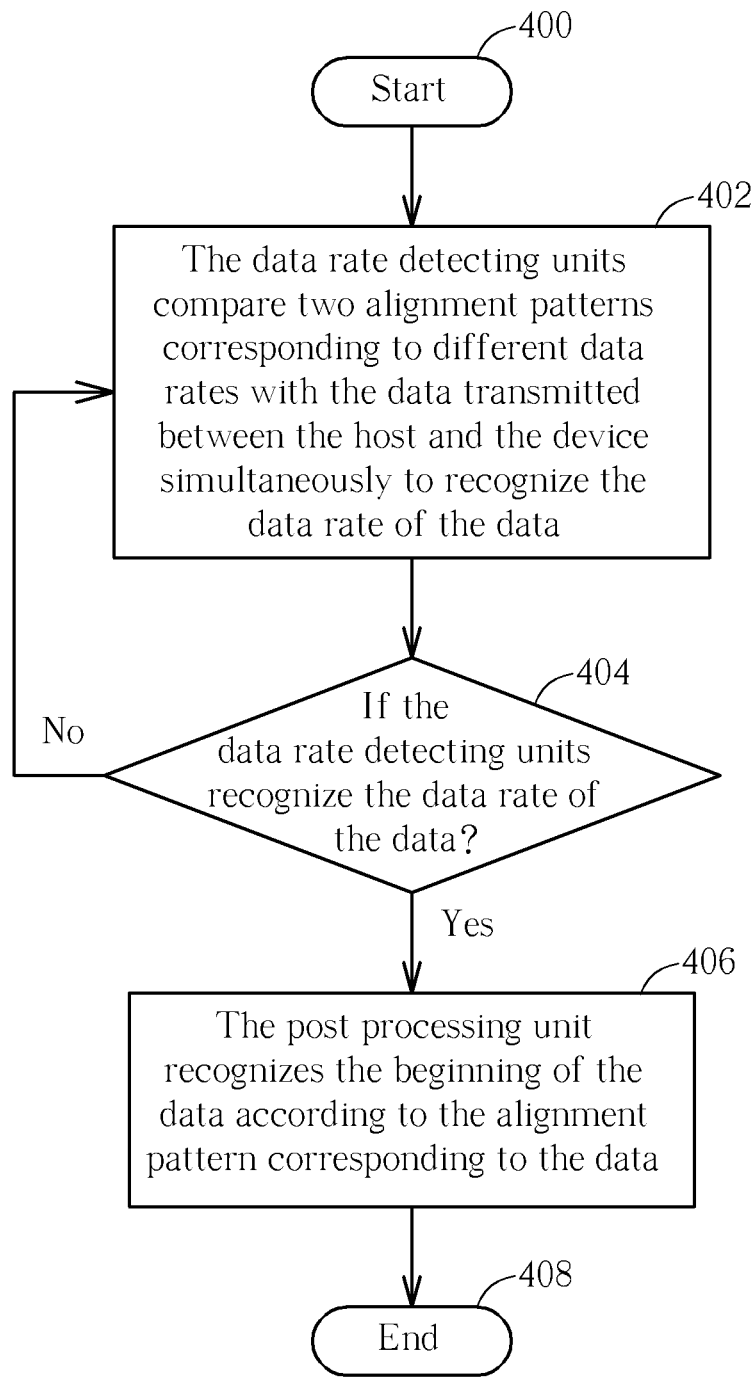
FIG. 4 is a flowchart illustrating a method for recognizing a beginning and a data rate of data according to another embodiment.

Please refer to FIG. 4. FIG. 4 is a flowchart illustrating a method for recognizing a beginning and a data rate of data according to another embodiment. FIG. 4 uses the circuit 300 in FIG. 3 to illustrate the method. Detailed steps are as follows:

Step 400: Start.

Step 402: The data rate detecting units 302, 304 compare two alignment patterns corresponding to different data rates with the data transmitted between the host 310 and the device 312 simultaneously to recognize the data rate of the data.

Step 404: If the data rate detecting units 302, 304 recognize the data rate of the data, go to Step 406; if not, go to Step 402.

Step 406: The post processing unit 308 recognizes the beginning of the data according to the alignment pattern corresponding to the data.

Step 408: End.

In Step 402, the different data rates corresponding to the two alignment patterns are two adjacent rates of the data rate specification. In Step 404, when the data rate detecting units 302, 304 do not recognize the data rate of the data, go to Step 402. The data rate detecting units 302, 304 compare two alignment patterns corresponding to another two adjacent rates of the data rate specification with the data simultaneously to recognize the data rate of the data again.

To sum up, the circuit for recognizing the beginning and the data rate of the data and method thereof utilizes the at least two data rate detecting units to compare the at least two alignment patterns corresponding to the different data rates with the data simultaneously to recognize the data rate of the data transmitted between the host and the device. Therefore, the present invention not only recognizes the beginning and the data rate of the data transmitted between the host and the device quickly, but also reduces failures of a clock and data recovery (CDR) when the prior art spends too much time to recognize the data rate of the data transmitted between the host and the device. Further, the present invention can ensure that the host uses a higher data rate supported by the host to communicate with the device, instead of using a lower data rate to communicate with the device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit for recognizing a beginning and a data rate of data, the circuit comprising:
   at least two data rate detecting circuits for comparing at least two alignment patterns corresponding to different data rates with data simultaneously to recognize the data rate of the data; and
   a post processing circuit coupled to the at least two data rate detecting circuits for recognizing the beginning of the data according to an alignment pattern corresponding to the data when the data rate of the data is recognized;
   wherein when the at least two data rate detecting circuits does not recognize the data rate is a first data rate or a second data rate within a predetermined time, the at least two data rate detecting circuits detects whether the data rate is a third data rate and a fourth data rate;
   wherein the first data rate and the second data rate are two adjacent rates of a data rate specification between a host and a device, and the third data rate and the fourth data rate are another two adjacent rates of the data rate specification.

2. The circuit of claim 1, wherein the at least two data rate detecting circuits comprise:
   a first data rate detecting circuit for detecting whether the data rate is the first data rate; and
   a second data rate detecting circuit for detecting whether the data rate is the second data rate;
   wherein when the first data rate detecting circuit and the second data rate detecting circuit does not recognize the data rate is the first data rate or the second data rate within the predetermined time, respectively, the first data rate detecting circuit and the second data rate detecting circuit detects whether the data rate is the third data rate or the fourth data rate, respectively.

3. The circuit of claim 1, wherein when the at least two data rate detecting circuits does not recognize the data rate is the first data rate or the second data rate within the predetermined time, the post processing circuit transmits a variable speed detecting command to the at least two data rate detecting circuits, the at least two data rate detecting circuits detects whether the data rate is the third data rate and the fourth data rate according to the variable speed detecting command.

4. A method for recognizing a beginning and a data rate of data, the method comprising:
   utilizing at least two data rate detecting circuits to compare at least two alignment patterns corresponding to different data rates with data simultaneously to recognize the data rate of the data; and
   recognizing the beginning of the data according to an alignment pattern corresponding to the data when the at least two data rate detecting circuits recognize the data rate of the data is a first data rate or a second data rate within a predetermined time;
   wherein when the at least two data rate detecting circuits does not recognize the data rate of the data is the first data rate or the second data rate within the predetermined time, the at least two data rate detecting circuits detects whether the data rate is a third data rate and a fourth data rate, wherein the third data rate and the fourth data rate are another two adjacent rates of the data rate specification;

wherein the first data rate and the second data rate are two adjacent rates of a data rate specification between a host and a device.

\* \* \* \* \*